United States Patent
Inaba et al.

(10) Patent No.: US 7,086,766 B2
(45) Date of Patent: Aug. 8, 2006

(54) RESIN MEMBER AND VEHICLE LIGHTING APPARATUS

(75) Inventors: Teruaki Inaba, Shizuoka (JP); Hideaki Yamamoto, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 187 days.

(21) Appl. No.: 10/670,728

(22) Filed: Sep. 26, 2003

(65) Prior Publication Data

US 2004/0061963 A1  Apr. 1, 2004

(30) Foreign Application Priority Data

Sep. 30, 2002 (JP) .......................... P.2002-285419

(51) Int. Cl.
*F21V 7/00* (2006.01)

(52) U.S. Cl. ............ 362/516; 362/341; 362/507; 359/838; 359/883

(58) Field of Classification Search ............ 362/459, 362/487, 507, 514, 516, 538, 539, 341; 359/629, 359/634, 838, 883, 884
See application file for complete search history.

(56) References Cited

U.S. PATENT DOCUMENTS 6,558,010 B1 *  5/2003  Takahashi .................. 359/552
2001/0026456 A1 * 10/2001  Murakoshi et al. ......... 362/516

FOREIGN PATENT DOCUMENTS

| JP | 6-76609 A | 3/1994 |
| JP | 10-147876 A | 6/1998 |
| JP | 2001-273804 A | 10/2001 |

* cited by examiner

*Primary Examiner*—Stephen Husar
*Assistant Examiner*—Meghan K. Dunwiddie
(74) *Attorney, Agent, or Firm*—Sughrue Mion, PLLC

(57) ABSTRACT

A half-mirror evaporated layer is formed by spattering all over a front face of a resin substrate, and at the front faces of the reflector parts, aluminum evaporated layers are further formed to be reflecting mirror faces on the half-mirror evaporated layer, while at the front face of an extension, the half-mirror evaporated face is exposed as a half-mirror face.

11 Claims, 9 Drawing Sheets

RESIN MEMBER AND VEHICLE LIGHTING APPARATUS

BACKGROUND OF THE INVENTION

The present invention relates to a vehicle lighting apparatus having a resin member.

A conventional vehicle lighting apparatus (called as briefly "vehicle lamp" or "lamp" hereafter) is furnished with a top-coat layer (protecting film) for protecting an evaporated layer in a reflecting mirror evaporated with aluminum. It is often practical to color the top-coat layer for coloring a light reflected on a reflecting mirror (called as "reflector" hereafter) part when lighting, and emitting, or to color the light injected into a lighting chamber at daylight, and reflected on the reflector part. The coloring of the top-coat layer is performed for giving high grade feeling or chromatically distinguishing the lamp in outside designs.

The lamp furnished with such a colored top-coat layer is disclosed in the Japanese Application Publication Number: 2001-273804 (JP-A-2001-273804), and is shown in FIG. 10.

In this lamp, a resin substrate 501 composing a reflector 5 is formed on its surface with an under-coat layer 502, an aluminum evaporated layer 503 is formed on the under-coat layer 502, and top-coat layers 505, 506 are formed on the aluminum evaporated layer 503 by a smoke coating. Of these top-coat layers 505, 506, the top-coat layer 505 having a significant surface 5x of the reflector 5 is not scattered with a pigment so as to make less loss of a light emitted from a light source, while the top-coat layers 505, 506 having a non-significant surface 5y is scattered with the pigment so as to color them for chromatically heightening the lamp in an outside design.

For manufacturing such a reflector 5, processes as shown in FIG. 11 are necessary.

At first, a forming process S1 is performed where a raw resin material of the reflector 5 is formed into a resin substrate 501 of a desired shape by such as an injection molding. Next, an under-coat layer forming process S2 is carried out to the formed resin substrate 501 on the surface thereof for heightening reflectance of aluminum. Subsequently, the process advances to an aluminum evaporating process S3 where an aluminum is subjected to a resistance heat evaporation to form an aluminum evaporated layer 503 on the under-coat layer 502. Then, the process goes to a smoke coating process S4 where the aluminum evaporated layer 503 is formed thereon with the top-coat layers 505, 506 by the smoke coating, and the reflectors is accomplished.

If the top-coat layers 505, 506 are formed on the reflector 5 by the smoke coating in order to improve the outside design of the lamp as disclosed in the above mentioned publication (JP-A-2001-273804), there are problems as follows.

Firstly, it is difficult to make a thickness of the coated film uniform, and there is left uneven outside appearance (as flaring up) being special to the coated face caused by difference in quantity of reflected light owing to irregularity of the coated film.

Further, in general, irregularity in the color is easy to appear. For example, if a density of a pigment is increased to make the colors deep, the pigment is difficult to disperse and easy to make lumps, so that the colors are easily irregular. Otherwise, reducing the density of the pigment to make the light colors, the coloring is poor, and if coating the paint several times, the paint runs down to easily cause the color to be irregular.

Since the coated film is wet for a little while after being coated, it absorbs foreign matters and spoils products. Thus, a yield is limited. Further, bad influences are given to environments by evaporation of a solvent contained in the paint.

SUMMARY OF THE INVENTION

The invention has been accomplished in view of the above mentioned problems, and accordingly it is an object of the invention to chromatically heighten designing quality of a vehicle lamp without coating a paint to the resin member of the lamp.

For solving the above mentioned problems, an invention of a first aspect is characterized by such a resin member, in which a half-mirror evaporated layer is formed by spattering on a resin substrate, while the half-mirror evaporated layer is formed thereon with a reflecting mirror face having an aluminum evaporated layer as well as a half-mirror face without forming the aluminum evaporated layer.

Since the half-mirror evaporated layer is formed by spattering on the resin substrate, this face is formed uniformly in thickness and color tone, and the color of the resin substrate passes through the half-mirror evaporated layer for making efficient, acquiring a metallic color tone, and effecting outside attractive. Besides, the color tone and shading may be easily adjusted by changing output and time of the spattering, and changing thickness in the evaporated layer. The coating is unnecessary so that cost is reduced and the working process is shortened. By means of the reflecting mirror face having the aluminum evaporated layer, the reflector part is less in loss of quantity of light.

An invention of a second aspect is, in the invention of the first aspect, characterized in that the half-mirror evaporated layer is formed by a chromium spattering.

Since the half-mirror evaporated layer formed by the chromium spattering has good corrosion resistance, protection by the top-coat layer is no longer necessary, so that the cost is reduced and the process is shortened.

An invention of a third aspect is, in the invention of the second aspect, characterized in that reflectance of the half-mirror evaporated layer is determined to be 30 to 65%. According to experiments, in case the reflectance of the half-mirror evaporated layer by the chromium spattering is determined to be 30 to 65%, the color of the resin substrate and the metallic color tone are well balanced and made especially outside attractive.

An invention of a fourth aspect is a vehicle lamp having an extension composed of the resin member as set forth in the first, second or third aspects. Accordingly, the invention of the fourth aspect displays the same performance as the first, second or third aspects, and chromatically heightens the designing quality of the lamp without decreasing the quality of light or coating the paint.

DESCRIPTION OF THE PREFERRED EMBODIMENT

In regard to a first embodiment of the invention, explanation will be made in detail, referring to FIGS. 1 to 6 of the attached drawings.

Figure 1:
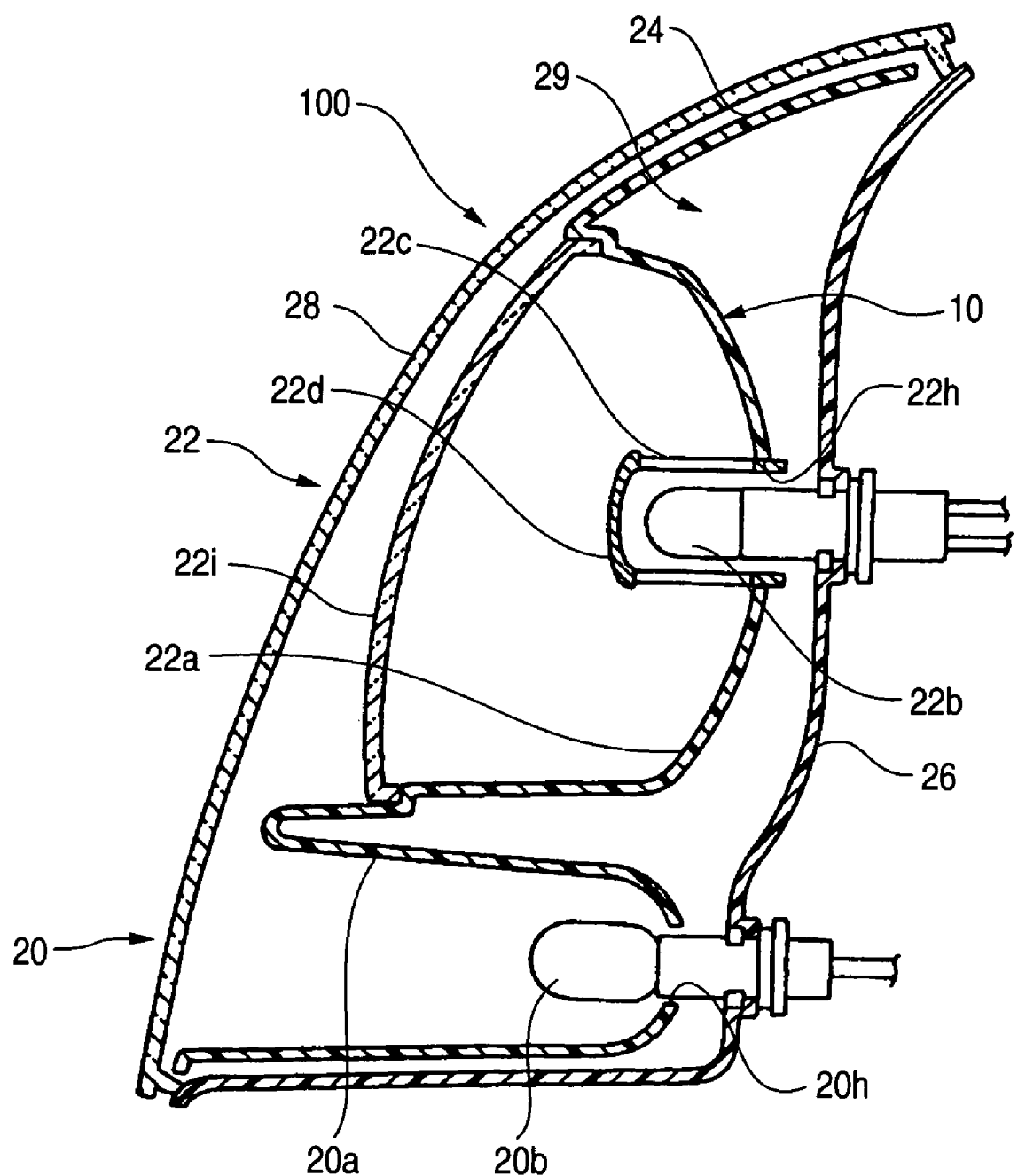
FIG. 1 is a vertical cross sectional view of the lighting apparatus according to the first embodiment of the invention.
Figure 2:
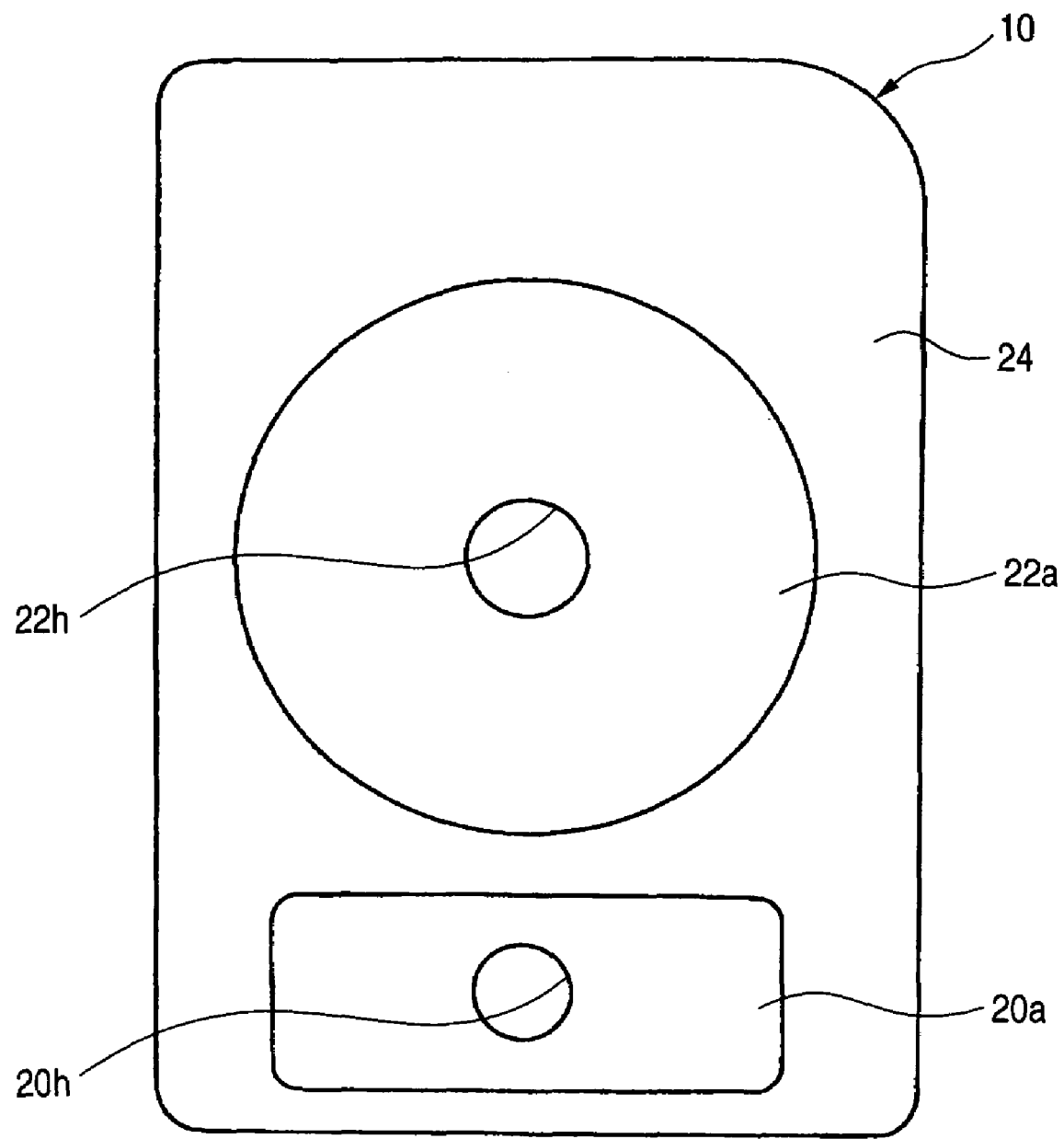
FIG. 2 is a front view of the resin member composing the reflector part and the extension of the lighting apparatus.
Figure 3:
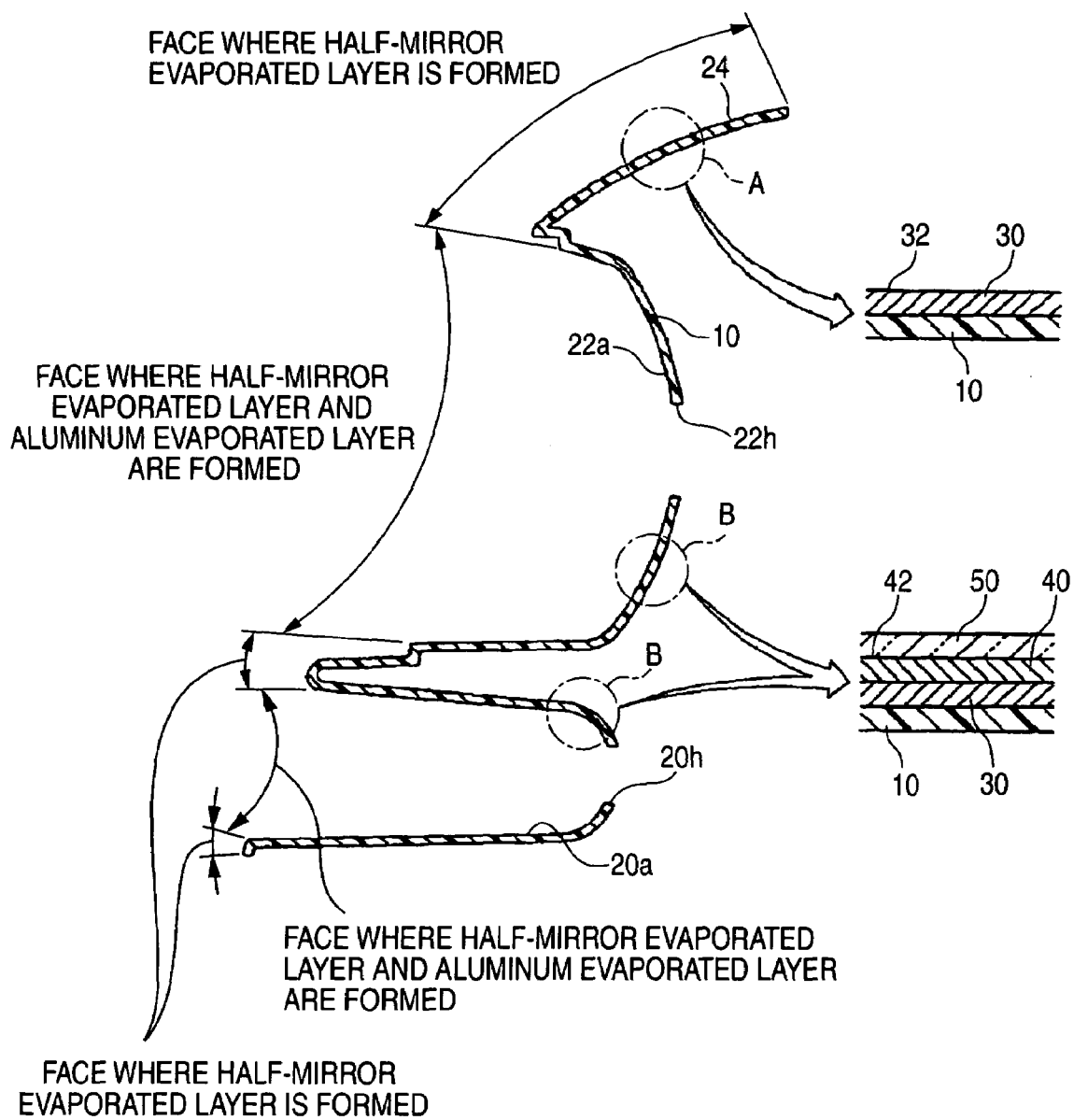
FIG. 3 is a view for explaining in detail the reflecting mirror part and the extension of the lighting apparatus.
Figure 4B:
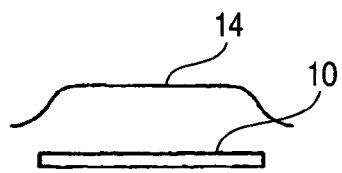
FIG. 4A and FIG. 4B are views for explaining the spattering.
Figure 4A:
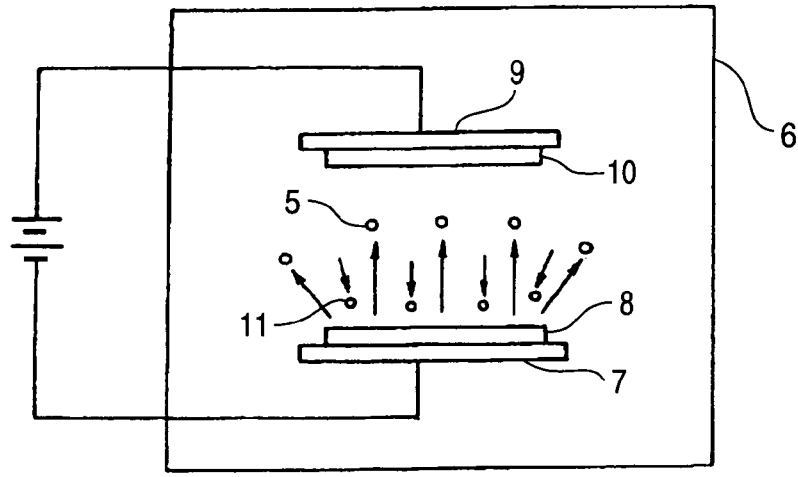
Figure 5:
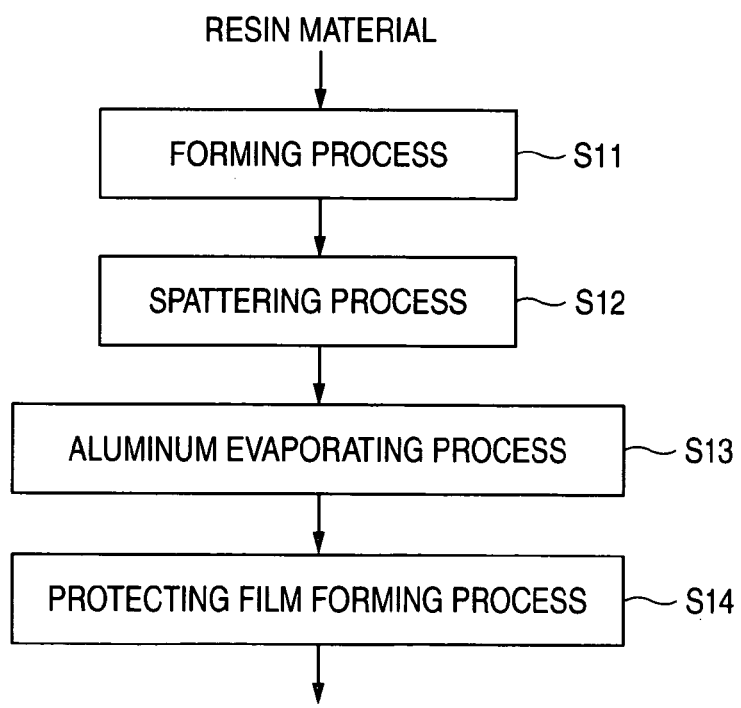
FIG. 5 is a view of the process for forming the half-mirror evaporated layer and the aluminum evaporated layer on the resin substrate of the lighting apparatus of the first embodiment.
Figure 6:
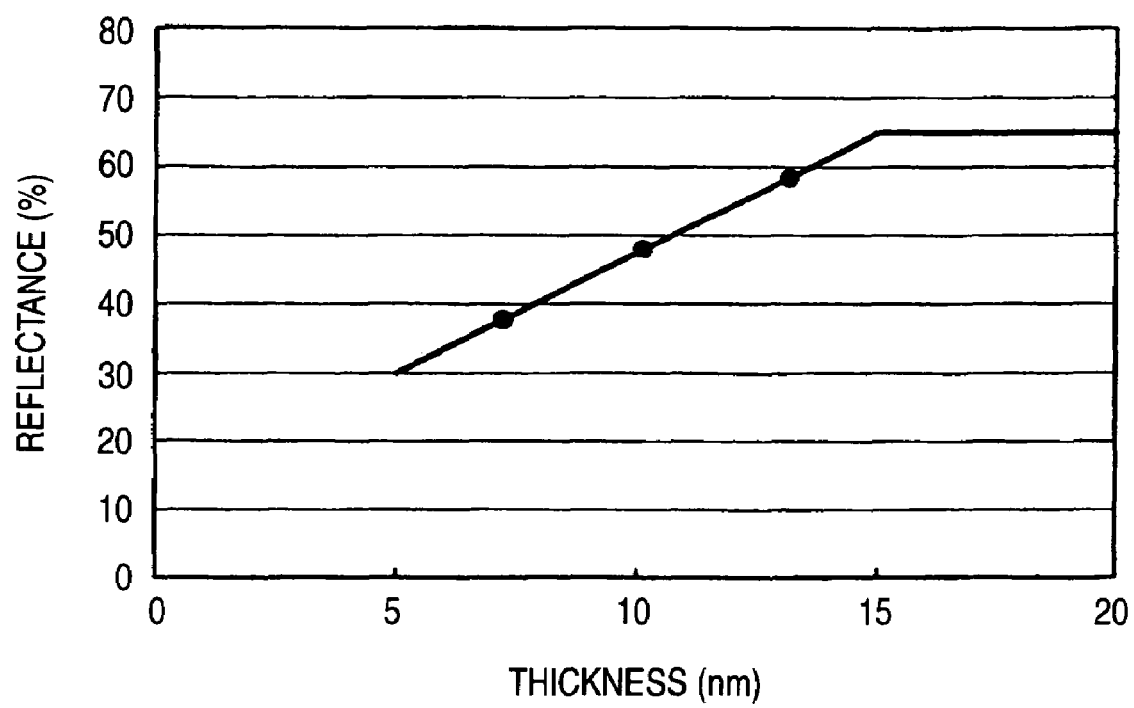
FIG. 6 is a view showing the relation between thickness of the half-mirror face and reflecting mirror face.

FIG. 1 is a vertical cross sectional view of the lamp according to the first embodiment of the invention. FIG. 2 is a front view of the resin member composing the reflector part and the extension of the lamp. FIG. 3 is a view for explaining in detail the reflector part and the extension of the lamp. FIG. 4A and FIG. 4B are views for explaining the spattering process. FIG. 5 is a view of the process for forming the half-mirror evaporated layer and the aluminum evaporated layer on the resin substrate of the lamp of the first embodiment. FIG. 6 is a view showing the relation between a thickness of a half-mirror face and a reflecting mirror face.

The lamp 100 unifies turn signal lamps 20 and tail stop lamps 22, and is concerned with rear combination lamps equipped at both left and right sides of a rear part of a vehicle.

The lamp 100 has a container-shaped lamp body 26, a transparent colorless outer cover 28 closing the front face of the lamp body 26, and a lamp chamber 29 sectioned with the lamp body 26 and the outer cover 28. The lamp chamber 29 is arranged at the interior with parabolic reflectors 20a, 22a in the turn signal lamps 20 as well as the tail stop lamps 22, and the resin substrate 10 formed with the extension 24 integrally extending from the circumference of the reflectors 20a, 22a. The extension 24 closes an opening created in the circumference of the reflectors 20a, 22a for sealing the interior of the lamp 100 through the opening so as to make the lamp 100 attractive.

At a focal position of the reflector part 20a of the turn signal lamps 20, a light source 20b composed of a bulb in umber color is placed. The light source 20b is bayonet-connected at its rear part to the lamp body 26 through an aperture 20h at a rear end of the reflector 20a. Also at a focal position of the reflector part 22a of the tail stop lamps 22, a light source 22b composed of a red bulb is placed. The light source 22b is bayonet-connected at its rear part to the lamp body 26 through an aperture 22h at a rear end of the reflector 22a. The light source 22b is protected with a cover 22c which is evaporated at a front end 22d with aluminum so that the light source 22b is not seen by the front end 22d of the cover 22c when looking at the lamp 100 from the front side.

At a front side of the light source 22b of the tail stop lamps 22, a transparent colorless inner lens 22i is arranged which is furnished with a diffusion step on a rear face for giving the tail stop lamps 22 a desired distribution of light.

The resin substrate 10 is formed by injection molding of black polycarbonate (PC). Other than this, there are available various resins such as acrylonitrile/ethylene-propylene-diene/styrene resin (AES), acrylonitrile/styrene/acrylate resin (ASA), acrylonitrile/butadiene/styrene resin (ABS), or polypropylene (PP). The resins other than PC probably demand the under-coat layer when chromium spattering. Of course, optional colors can be selected in response to designing requirements.

On the whole of the front face of the resin substrate 10, as shown at an enlarged A part in FIG. 3, chromium is evaporated by spattering and the half-mirror evaporated layer 30 of less than 20 nm is formed. Further, on the front faces of the reflector parts 20a, 22a, as shown at an enlarged B part in the same, aluminum is evaporated and the aluminum evaporated layer 40 of 100 to 150 nm is formed. The aluminum evaporated layer 40 is the reflecting mirror face 42 reflecting almost all of the injected light, and is formed thereon with a further protective film 50 such as polymerized film of organic silicone.

The front face of the extension 24 is, as shown at the enlarged A part, the chromium half-mirror evaporated layer 30 remains as exposed. The half-mirror evaporated layer 30 is a half-mirror face which reflects about half of the injected light and passes about half of the injected light. Therefore, in the half-mirror face 32 exposing the half-mirror evaporated layer 30, the color of the resin substrate 10 transmits the half-mirror evaporated layer 30, and the reflected light of a metallic color tone is present, and so while making the color of the resin substrate 10 efficient, the metallic color tone having hard image is obtained.

On the basis of FIG. 4A, explanation will be made to a method of evaporating the chromium on the resin substrate 10 by spattering. Within a vessel 6 supporting Ar gas atmosphere of low pressure, there are placed a cathode 7 fixing a chromium target 8 to be evaporated and an anode 9 fixing the resin substrate 10, and voltage is supplied between the cathode 7 and the anode 9 to cause discharge. Then, the Ar gas is ionized and Ar ions 11 collide against the chromium target 8 on the cathode 7, and chromium atoms 5 leap out from the chromium target 8 by the collision, and when the chromium atoms 5 leap on the surface of the resin substrate 10, the chromium is evaporated on the resin substrate 10.

In the spattering, since the chromium atoms uniformly leap out from the whole of the surface of the sheet-like chromium target 8 having a broad area, the chromium can be evaporated on the surface of the resin substrate 10 in a uniform thickness 14 of high purity as shown in FIG. 4B.

On the basis of processes shown in FIG. 5, explanation will be made to a method of forming the half-mirror evaporated layer and the aluminum evaporated layer on the resin substrate.

At first, in a forming process S11, a raw resin material (polycarbonate) is formed by injection molding so as to manufacture the resin substrate 10 having the reflector parts 20a, 22a and the extension 24.

Next, the process advances to a chromium spattering process S12 in which the chromium is evaporated by spattering on the whole of the front face of the resin substrate 10, and the half-mirror evaporated layer 30 is formed. A pre-treatment such as forming the under-coat layer or de-humidification drying having been necessary to the aluminum evaporation is not required before the chromium spattering process S12. But, depending on the resin substrate 10 (for example, polypropylene resin), the under-coat layer forming process might be necessary.

Subsequently, the process goes to the aluminum evaporating process S13 in which the mask is formed on the extension 24 and the aluminum is evaporated as conventionally on the half-mirror evaporated layer 30 before the resin substrate 10. Thus, on the only reflector parts 20a, 22a, the reflecting mirror faces 20e, 22e comprising the aluminum evaporated layer 40 is formed. Herein, the half-mirror evaporated layer 30 becomes the under-coat layer of the aluminum evaporated layer 40.

The process advances to the protecting film forming process S14. While the mask is held on the extension 24, the protective film 50 such as a polymerized film of an organic silicone is formed on the aluminum evaporated layer 40 by a plasma polymerization, so that the resin member is manufactured.

Incidentally, in general, the longer the spattering time, the larger the thickness of the half-mirror evaporated layer 30. In addition, the larger the output supplied when spattering, the larger the film thickness of the half-mirror evaporated layer 30. If adjusting the spattering output and time, the thickness of the half-mirror evaporated layer 30 can be arbitrarily adjusted. As to the thickness and the reflectance of the half-mirror evaporated layer 30, as shown in FIG. 6, the reflectance becomes higher together with the thickness until the thickness is 15 nm, and it reaches a top when the reflectance is 65%, and by adjusting the spattering output and time, the thickness of the half-mirror evaporated layer 30 can be arbitrarily adjusted.

According to experiments, while the color of the resin substrate 10 is made efficient, the metallic color tone of hard image is obtained, and when the reflectance of the half-mirror evaporated layer 30 is 30 to 65%, many people feel it most attractive, and at this time, the thickness of the half-mirror evaporated layer 30 is around 5 to 15 nm.

Since the embodiment is composed as mentioned above, effects are displayed as follows.

In the lamp 100, since the chromium half-mirror evaporated layer 30 is formed on the resin substrate 10 composing the extension 24, the half-mirror evaporated layer 30 can effect the color tone while making the color of the resin substrate efficient, and the metallic color tone of hard image is obtained. Besides, since the chromium has good adhesion and corrosion resistance, the pre-treatment as forming the under-coat layer is unnecessary before the spattering, and cost can be cut down and the working processes can be shortened.

Since the half-mirror evaporated layer 30 is formed by spattering, it can be formed to be uniform in thickness and made attractive. Moreover, since the thickness of the half-mirror evaporated layer 30 can be changed by changing the spattering output and time, the color tone and shading can be easily adjusted.

Since the painting is not carried out, it is not practiced as conventional examples that the coated film absorbs foreign matters and spoils products, and the yield is increased. Further, bad influences are not given to environments by evaporation of a solvent contained in the paint.

Figure 7:
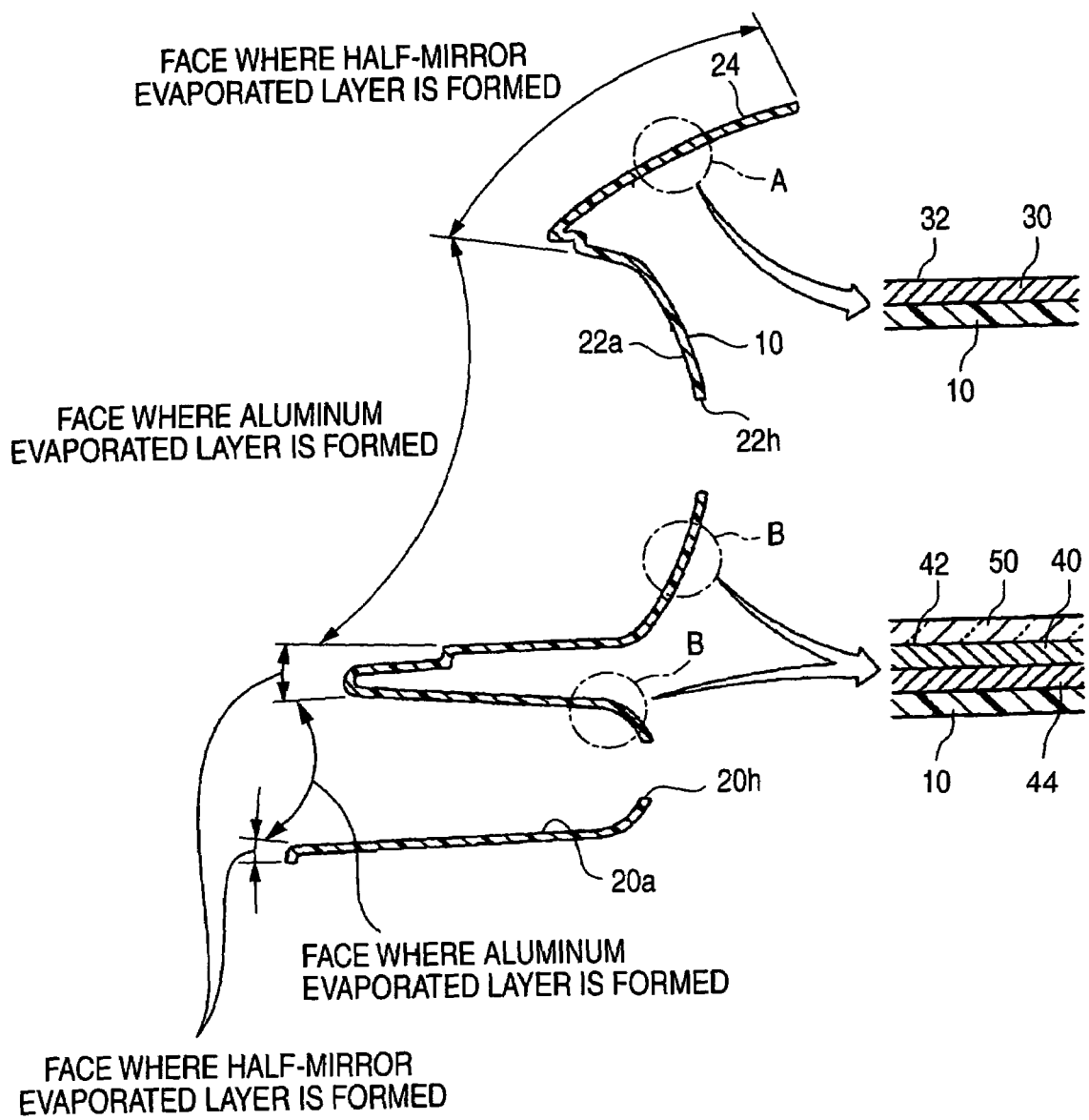
FIG. 7 is a view for explaining in detail the reflector part and the extension of the lighting apparatus according to the second embodiment of the invention.

Next, a second embodiment will be explained on the basis of FIG. 7 showing the extension and the reflector part in detail.

In the first embodiment, the aluminum evaporated layer 40 is formed on the chromium half-mirror evaporated layer 30 in the reflector parts 20a, 22a. However in this embodiment, in the reflector parts 20a, 22a, the under-coat layer 44 is formed on the resin substrate 10 as shown at the enlarged view of B, and the aluminum evaporated layer 40 is formed on the under-coat layer 44, and the protective film 50 is formed on the aluminum evaporated layer 40. Others are the same as those of the first embodiment in general.

For forming the reflector parts 20a, 22a, the masks are placed only before the reflector parts 20a, 22a, while the resin substrate 10 is performed with the chromium spattering, and then, the mask is placed before the extension 24, and the aluminum evaporation is performed to the resin substrate 10 as the conventional manner. This embodiment displays the same effect as the first embodiment.

Figure 8:
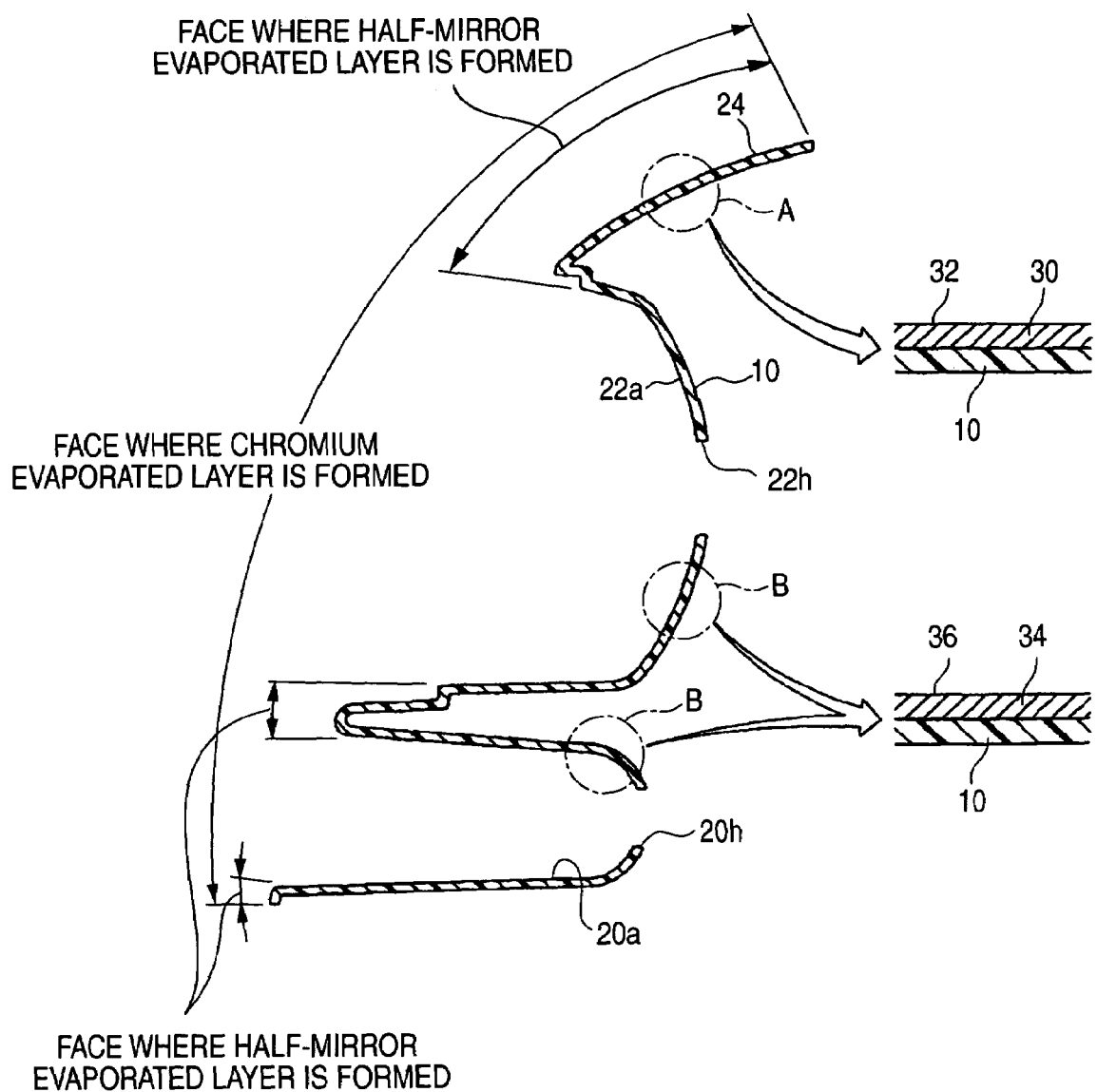
FIG. 8 is a view for explaining in detail the reflector part and the extension of the lighting apparatus according to the third embodiment of the invention.

Now, a third embodiment will be explained on the basis of FIG. 8 showing the extension and the reflector part in detail.

In the first and second embodiments, the aluminum evaporated layer 40 is formed in the reflector parts 20a, 22a. However in this embodiment, the chromium is evaporated by spattering all over the front face of the resin substrate 10, and as shown at the enlarged view of A, the half-mirror evaporated layer 30 is formed all over the resin substrate 10. Then, the mask is placed to the extension 24, and the chromium spattering is again carried out. The reflecting mirror faces 36 are formed such that the chromium evaporated layer 34 of the reflector parts 20a, 22a are made thicker than the half-mirror evaporated layer 30. Others are the same as those of the first embodiment in general.

Although the chromium evaporated layer 34 of this embodiment is inferior in the reflectance to the aluminum evaporated layer, a necessary reflectance as the reflector of a sign post can be secured. The embodiment displays the same effects as the first embodiment, and besides, since the chromium half-mirror evaporated layer 30 and the chromium evaporated layer 34 do not demand the protective film, cost can be cut down and the working processes can be shortened.

Figure 9:
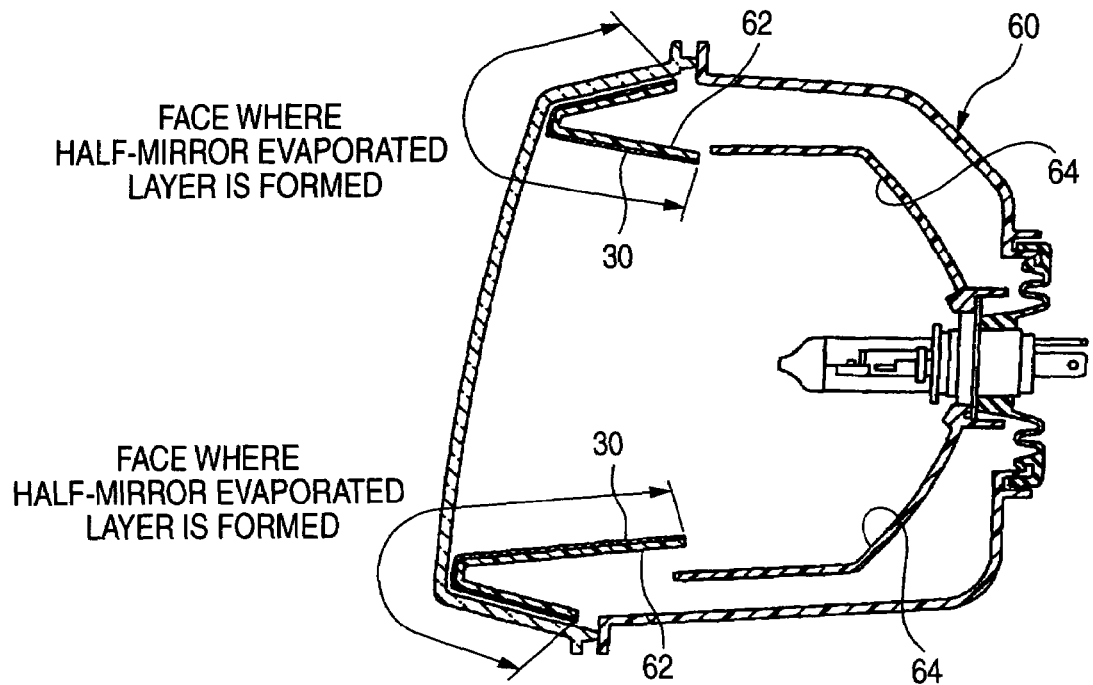
FIG. 9 is a vertical cross sectional view of the lighting apparatus according to the third embodiment.
Figure 10:
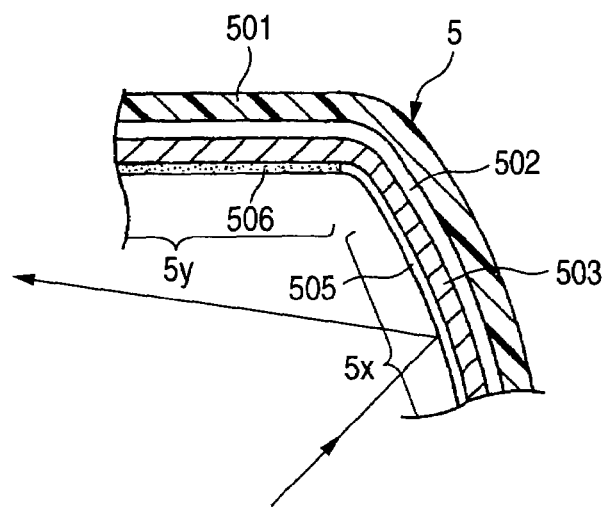
FIG. 10 is a view showing the lighting apparatus furnished with the conventional colored top-coat layer.
Figure 11:
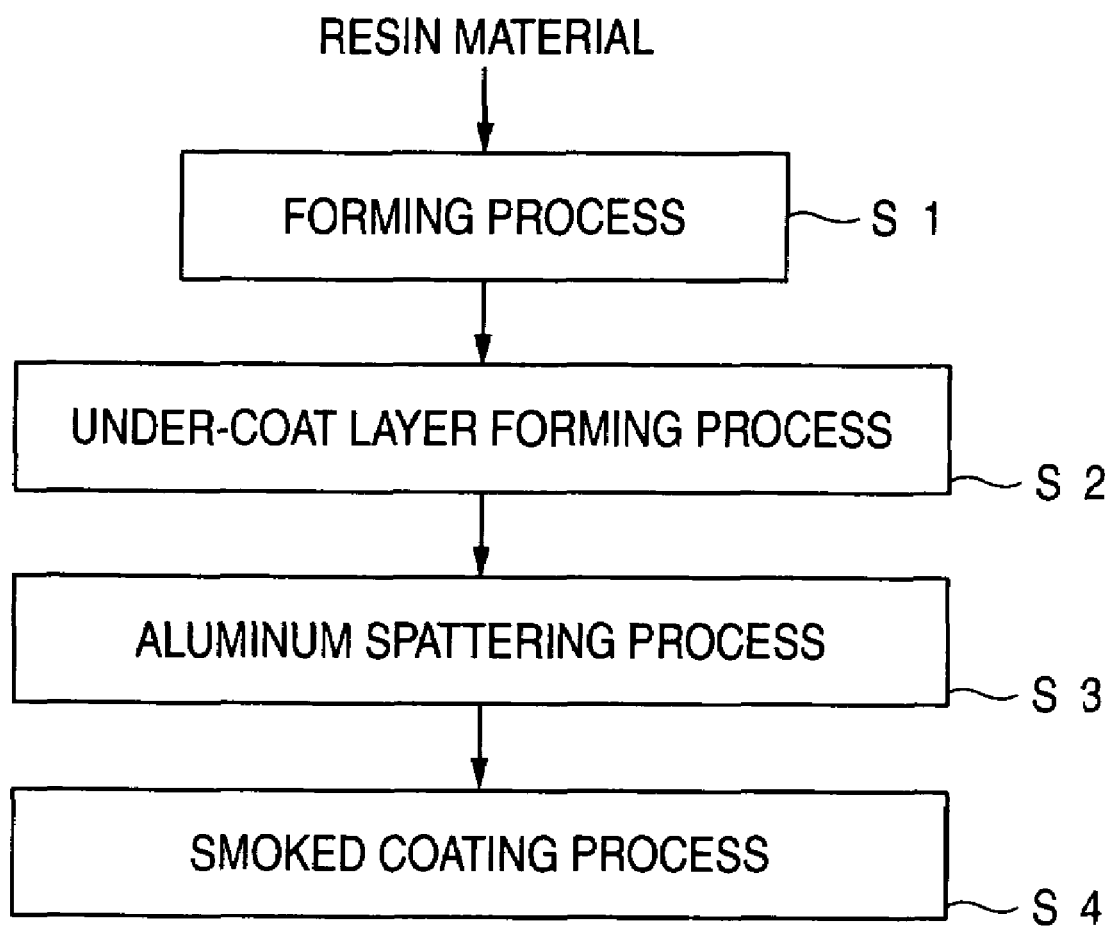
FIG. 11 is a view of the process for manufacturing the reflecting mirror face of the conventional lighting apparatus furnished with the top-coat layer.

On the basis of FIG. 9, a fourth embodiment will be explained. This embodiment is concerned with a head lamp 60 in which the half-mirror evaporated layer 30 is formed by evaporating the chromium on the front faces of the extension 62. A color of the extension is preferably a color near to silver of the reflector 64. Others are the same as the above mentioned head lamps in general. Since the reflector 64 of the head lamp has a high temperature, the extension 62 is independent of the reflector 64. This embodiment also exhibits the same effects as the first embodiment.

Incidentally, the invention is not limited to the above mentioned embodiments, and various deformations are available.

For instance, in the first embodiment, the front faces of the reflector parts 20a, 22a are all the reflecting mirror faces 42, but as to the non-significant face not reflecting the light emitted from the light source s 20b, 22b in a parallel direction with an optical axis, it is sufficient that the aluminum evaporated layer is not formed but the chromium half-mirror evaporated layer 30 is exposed as the half-mirror face 32. In this case, since colored parts are increased, the designing quality may be heightened.

Further, in the above respective embodiments, the chromium half-mirror evaporated layer 30 is formed on the resin substrate 10, but metals other than the chromium, for instance, aluminum, titanium or appropriate alloys may be evaporated. Of course, the invention can be applied to general vehicle lamps.

As apparently from the above explanation, according to the invention of the first aspect, since the half-mirror evaporated layer is formed by spattering on the light impermeable resin substrate, the half-mirror evaporated layer is made uniform in thickness and color tone, and besides, the metallic color tone is obtained as making the color of the resin substrate efficient and more attractive than that of the smoke coating, so that the designing property is heightened. Moreover, the color tone and shading can be easily adjusted by changing the spattering output and time so as to change the thickness of the evaporated layer. Since the painting is not carried out, it is not practiced that the coated film absorbs foreign matters and spoils products, and the yield is increased. Further, bad influences are not given to environments by evaporation of a solvent contained in the paint. By the reflecting mirror face formed with the aluminum evaporated layer on the half-mirror evaporated layer, the light can be reflected without causing loss of light.

In the invention of the second aspect, since the half-mirror evaporated layer is formed by the chromium spattering process, the top-coat layer is no longer necessary, because the chromium has the good corrosion resistance, so that the cost is reduced and the working process is shortened.

In the invention of the third aspect, since the reflectance of the half-mirror evaporated layer is determined to be 30 to 65%, the color of the resin substrate and the metallic color tone are well balanced and made especially outside attractive.

The invention of the fourth aspect is the vehicle lamp having the extension composed of the resin member as set forth in the first, second or third aspects. Accordingly, the same performance are displayed as the first, second or third aspects, and chromatically heightens the designing quality of the lamp without decreasing the quality of light or coating the paint.

What is claimed is:

1. A resin member, comprising
a half-mirror evaporated layer formed on a resin substrate by spattering, and
an aluminum evaporated layer formed partially on the half-mirror evaporated layer,
wherein a portion with the aluminum evaporated layer is formed to be a reflecting mirror face, and
a portion without the aluminum evaporated layer is formed to be a half-mirror face.

2. A resin member according to claim 1, wherein the half-mirror evaporated layer is formed by chromium spattering.

3. A resin member according to claim 2, wherein reflectance of the half-mirror face is determined to be 30 to 65%.

4. A resin member according to claim 1, wherein the half-mirror evaporated layer is formed via an under-coat layer on the resin substrate.

5. A resin member according to claim 1, wherein a protective film is formed on the aluminum evaporated layer.

6. A vehicle lighting apparatus comprising an extension made of the resin member according to claim 1.

7. A vehicle lighting apparatus, comprising
a half-mirror face having a half-mirror evaporated layer formed on a resin substrate by chromium spattering, and
a reflecting mirror face having a chromium evaporated layer with a larger thickness of chromium than a thickness of the half-mirror evaporated layer of the half-mirror face.

8. A vehicle lighting apparatus, comprising a reflector part and an extension,
wherein the half-mirror evaporated layer is formed by chromium spattering on the reflector part and the extension, and an aluminum evaporated layer is formed on the half-mirror evaporated layer of only the reflector part.

9. A vehicle lighting apparatus according to claim 8, wherein, on a non-significant face of the reflector part which does not reflect the light emitted from a light source in a parallel direction with an optical axis, the aluminum evaporated layer is not applied and the half-mirror evaporated layer is exposed thereon.

10. A vehicle lighting apparatus, comprising a reflector part and an extension,
wherein, at least on the extension, a half-mirror evaporated layer is formed by chromium spattering; and
wherein an aluminum evaporated layer is formed on the reflector part via an under-coat layer on a resin substrate.

11. A vehicle lighting apparatus, comprising a reflector part and an extension,
wherein, at least on the extension, a half-mirror evaporated layer is formed by chromium spattering; and
wherein the extension is formed to be separate from the reflector.

* * * * *